(12) United States Patent
Anvari

(10) Patent No.: US 7,142,831 B2
(45) Date of Patent: Nov. 28, 2006

(54) CREST FACTOR REDUCTION AND AMPLITUDE PRE-DISTORTION FOR MULTI-CARRIER SIGNALS

(75) Inventor: Kiomars Anvari, 1567 Serafix Rd., Alamo, CA (US) 94507

(73) Assignee: Kiomars Anvari, Alamo, CA (US)

( * ) Notice: Subject to any disclaimer, the term of this patent is extended or adjusted under 35 U.S.C. 154(b) by 335 days.

(21) Appl. No.: 10/738,336

(22) Filed: Dec. 18, 2003

(65) Prior Publication Data

US 2005/0136859 A1 Jun. 23, 2005

(51) Int. Cl.
*H04B 1/04* (2006.01)

(52) U.S. Cl. .................. 455/114.2; 455/522; 330/107; 375/296

(58) Field of Classification Search ............ 455/114.2, 455/114.1, 126, 522; 330/107; 375/296, 375/260
See application file for complete search history.

(56) References Cited

U.S. PATENT DOCUMENTS

| | | | | |
|---|---|---|---|---|
| 5,193,224 A | * | 3/1993 | McNicol et al. | 455/126 |
| 5,237,288 A | * | 8/1993 | Cleveland | 330/107 |
| 6,751,447 B1 | * | 6/2004 | Jin et al. | 455/114.3 |
| 6,928,272 B1 | * | 8/2005 | Doi | 455/114.2 |
| 6,999,733 B1 | * | 2/2006 | Hori et al. | 455/114.2 |
| 2003/0054851 A1 | * | 3/2003 | Jo et al. | 455/522 |

\* cited by examiner

*Primary Examiner*—Edward F. Urban
*Assistant Examiner*—Blane J. Jackson

(57) ABSTRACT

A technique for Crest Factor reduction and amplitude pre-distortion of multi-carrier signals is described. The input to the multi-carrier amplifier is modified by a Crest Factor reduction and amplitude pre-distortion circuit, prior to being applied to the amplifier. The Crest Factor reduction and amplitude pre-distortion circuit first clips the amplitude of the signal, converts the clipped signal to baseband to produce the baseband representative of each carrier, filters each baseband representative to remove the unwanted signals, up converts each baseband representative to its multi-carrier baseband frequency and finally the up converted signals are combined to produce the multi-carrier baseband signal. The Crest Factor reduction and amplitude pre-distortion circuit next pre-distort the amplitude of the signal using a look up table before applying the signal to the amplifier. The main signal input to the Crest Factor reduction and amplitude pre-distortion circuit could be a baseband, an intermediate frequency (IF) or radio frequency (RF) signal. The feedback signal to Crest Factor reduction and amplitude pre-distortion circuit is the envelop of the amplifier output. The Crest Factor reduction and amplitude pre-distortion could be performed in digital or analog domain.

20 Claims, 10 Drawing Sheets

CREST FACTOR REDUCTION AND AMPLITUDE PRE-DISTORTION FOR MULTI-CARRIER SIGNALS

BACKGROUND OF INVENTION

The present invention relates to a Crest Factor reduction and amplitude pre-distortion circuit to boost the out put power of a multi-carrier wireless RF amplifier. The Crest Factor reduction and amplitude pre-distortion circuit main input could be baseband, intermediate frequency (IF), or RF signal, the feedback signal from the amplifier is at the operating frequency and its output is the Crest Factor reduced RF signal as a new input to the amplifier. In any wireless communication system one of the critical components is the power amplifier. This component has a major contribution in cost, power consumption, and size of the system. The main reason is the requirement of wireless radio communication system for linear amplifiers. The higher the linearity, the higher the power consumption, cost and size. In order to minimize the cost, size and power consumption there is a need for techniques that overcome this problem. This invention conquers these challenges by using a simple and accurate Crest Factor reduction and amplitude pre-distortion module used at the input to the amplifier.

SUMMARY OF INVENTION

According to the invention, a low-cost RF Crest Factor reduction and amplitude pre-distortion circuit, for use with multi-carrier RF amplifier, uses a plurality of simple and accurate circuits in conjunction with intelligent signal processing to improve power handling of the multi-carrier amplifier. By intelligent, it is meant that the Crest Factor reduction and amplitude pre-distortion module has features of removing the unwanted signals after applying the Crest Factor reduction and amplitude pre-distortion function. It also has features of adaptability to the environment, such as ability to consider the changes due to environmental changed and aging. The Crest Factor reduction and amplitude pre-distortion module uses the amplifier input which could be a baseband, an IF or RF signal as its input and conditions the input before applying to the multi-carrier amplifier. The conditioning or Crest Factor reduction and amplitude pre-distortion helps to boost the power handling of the amplifier or acts more linearly. The inputs to the Crest Factor reduction and amplitude pre-distortion should be within a limit that can be handled by the Crest Factor reduction and amplitude pre-distortion module.

In a particular embodiment, the Crest Factor reduction and amplitude pre-distortion unit comprises a multi-carrier transmitter, an envelop detector, a multi-carrier broadband receiver, a signal processing, and a clock generator. The receiver converts the baseband, IF, or RF signal to digital baseband and the transmitter converts the digital baseband signal to RF. The envelop detector takes the feedback from the amplifier and detects the envelop of the feedback signal. The signal processor performs the signal conditioning as well as performs the initial calibration, and transmitter and receiver control.

The invention will be better understood by reference to the following detailed description in conjunction with the accompanying drawings.

DESCRIPTION OF THE SPECIFIC EMBODIMENTS

In a first preferred embodiment the Crest Factor reduction and amplitude pre-distortion circuit monitors the signal strength of the multi-carrier input signal channels using the input receiver and finds the frequency and channel number of the input signals. In a second preferred embodiment of the invention, the Crest Factor reduction and amplitude pre-distortion circuit uses sub-harmonic sampling to convert multi-carrier RF or IF signals to digital baseband signal. In a third preferred embodiment the envelop of the feedback signal from output of the amplifier is converted to digital feedback envelop signal. In a fourth preferred embodiment the input signal is conditioned or Crest Factor reduced using the multi-carrier baseband signal. In a fifth preferred embodiment the digital baseband signal is further down converted to produce the individual carrier baseband signal. In a sixth preferred embodiment the multi-carrier signal is amplitude clipped or limited either in analog or digital domain. In a seventh preferred embodiment the individual baseband signals are individually filtered and up converted to reconstruct the multi-carrier digital baseband signal. In a eighth preferred embodiment the Crest factor reduced main signal is pre-distort using a look up table. In a ninth preferred embodiment the digitized feedback envelop signal from the output of the amplifier and the Crest Factor reduced signals are used to produce the amplitude pre-distortion look up table. In a tenth preferred embodiment the digitized feedback envelop signal from the output of the amplifier and the Crest Factor reduced main baseband signals are used to adjust the gain and the timing of the two inputs to the amplitude look up table algorithm.

Figure 1:
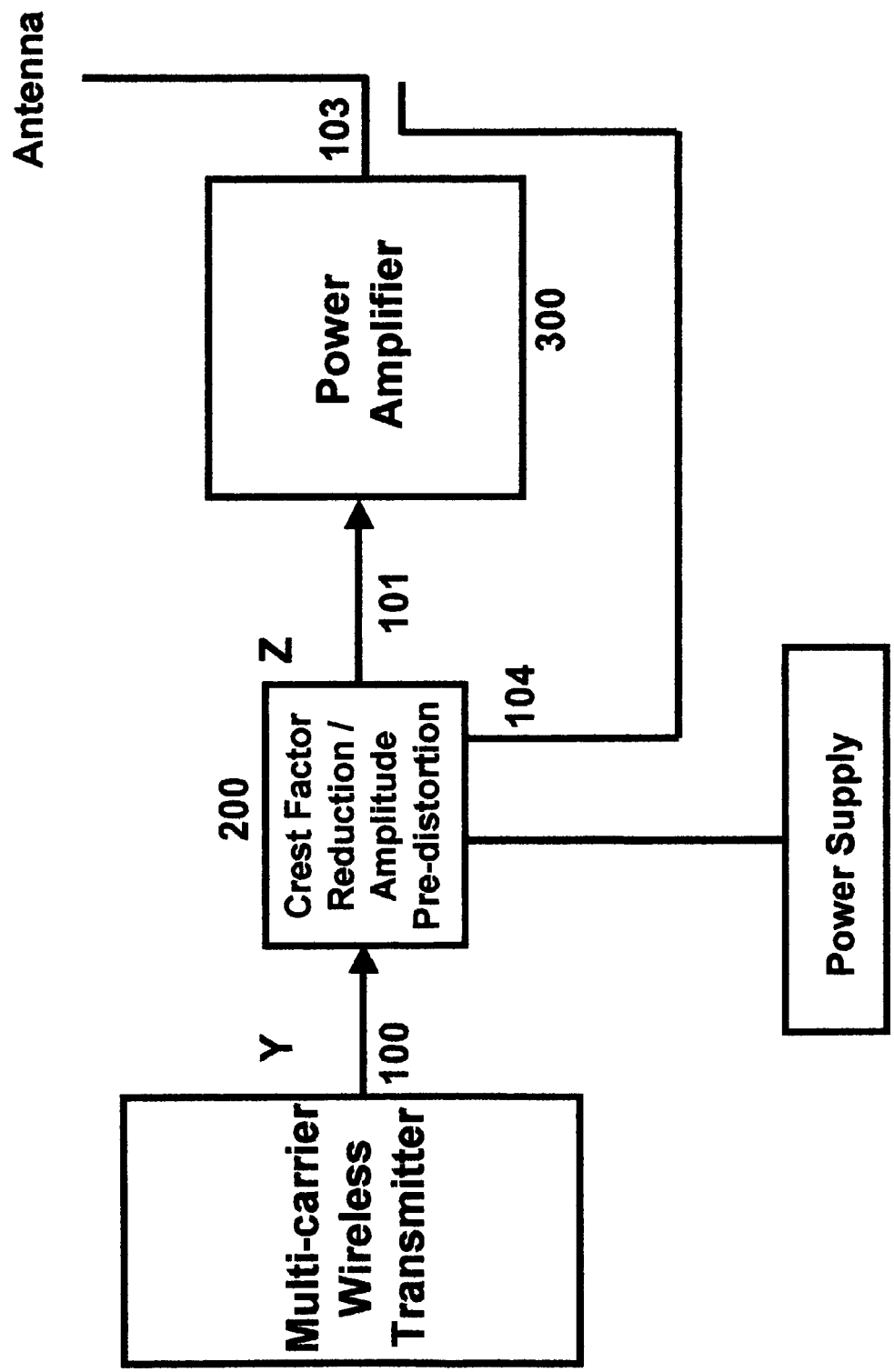
FIG. 1 is an overall block diagram of the a amplifier with a booster using Crest Factor reduction and amplitude pre-distortion

Referring to FIG. 1, a Crest Factor reduction and amplitude pre-distortion circuit diagram is illustrated. The systems receive its inputs from wireless transmitter 100. The output of the Crest Factor reduction and amplitude pre-distortion circuit 200 is applied to the input of the amplifier block 300. The Crest Factor reduction and amplitude pre-distortion circuit performs the following functions:

1. Finds the frequencies and channel numbers of the multi-carrier wireless transmitter output 100.
2. Reduce the Crest Factor of the input signal 100 before applying to the amplifier.
3. Pre-distort the amplitude of the Crest Factor reduced signal 100 before applying to the amplifier.

4. Use the Crest Factor reduced signal and the digitized feedback envelop signal from the output of the amplifier to produce the amplitude pre-distortion look up table.
5. Adaptively adjust the gain in the signal paths to keep the total gain from input to output of the Crest Factor reduction and amplitude pre-distortion zero.
6. Adaptively adjust the gain in the signal paths from main multi-carrier receiver and feedback envelop signal to an equal and optimal level for further processing.
7. Adaptively adjust the delay in the multi-carrier receiver signal path, until the main and feedback signals are aligned in time/phase. This is measured by cross-correlating between the two signals.
8. Select the best sample value by changing the decimation filter coefficients. This allows the delay to be adjusted to a small fraction of input signal symbol period.

Figure 2:
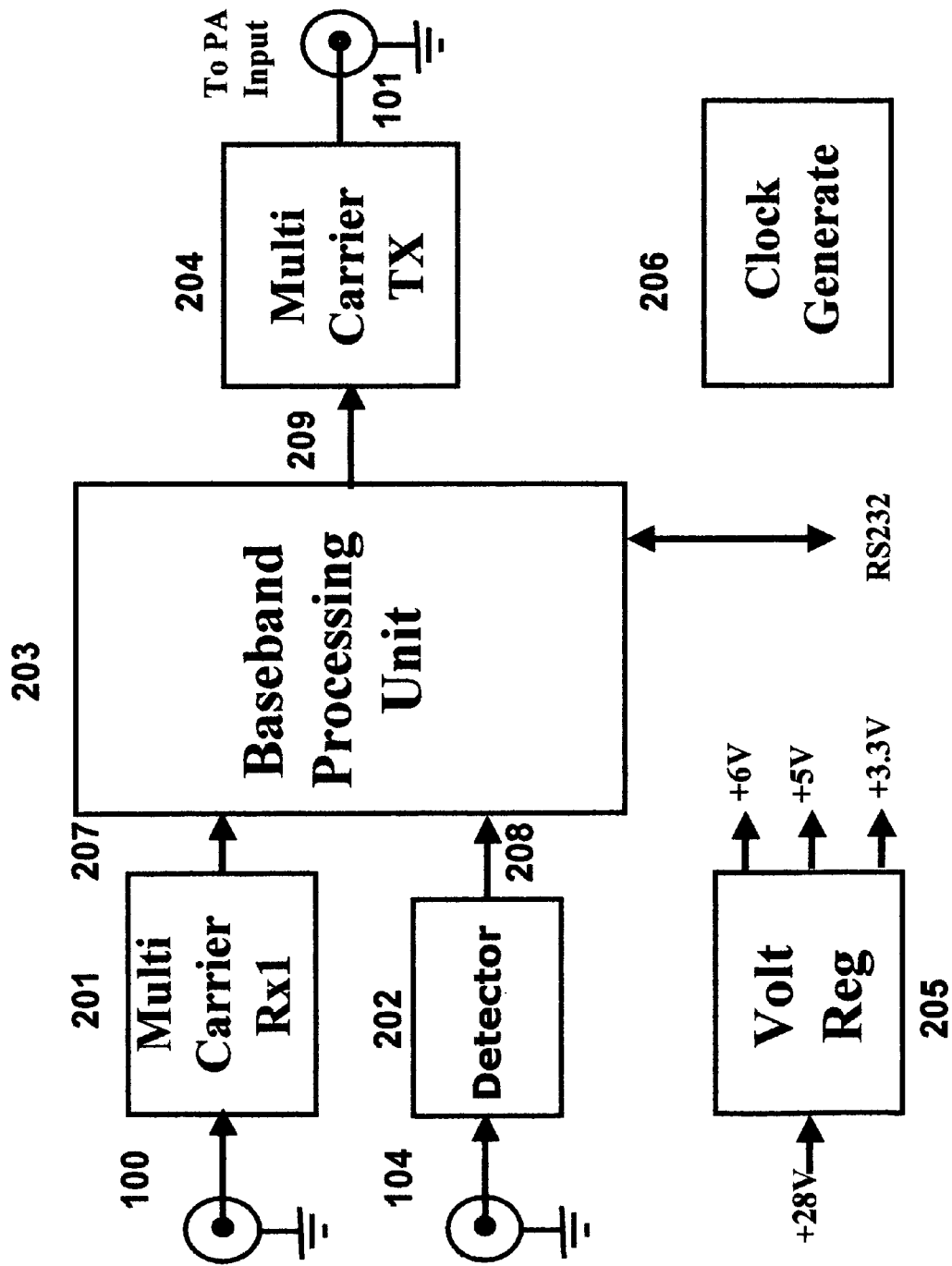
FIG. 2 is the block diagram of the Crest Factor reduction and amplitude pre-distortion module

FIG. 2 illustrates the detail block diagram of the Crest Factor reduction and amplitude pre-distortion circuit unit. The received signal from multi-carrier wireless transmitter 100 is applied to multi-carrier receiver 201 to produce main signal 207. The output of the multi-carrier receiver 201 is applied to signal processing block 203 for digital signal processing which is Crest Factor reduction and amplitude pre-distortion and filtering of baseband representation of each carrier. The output of signal processing block 203 the Crest Factor reduced and amplitude pre-distort signal 209 is applied to multi-carrier transmitter 204 to create the input signal 101 for the multi-carrier amplifier. The received feedback signal 104 from the output of the amplifier is applied to envelop detection circuit 202 to produce the envelop signal 208. The envelop signal 208 and the main signal 207 are used by digital signal processing block 203 to produce the amplitude pre-distortion look up table. Clock generator 206 produces all the clocks necessary for the Crest Factor reduction and amplitude pre-distortion circuit and the power supply block 205 produce all the voltages necessary for the Crest Factor reduction and amplitude pre-distortion circuit.

Figure 3:
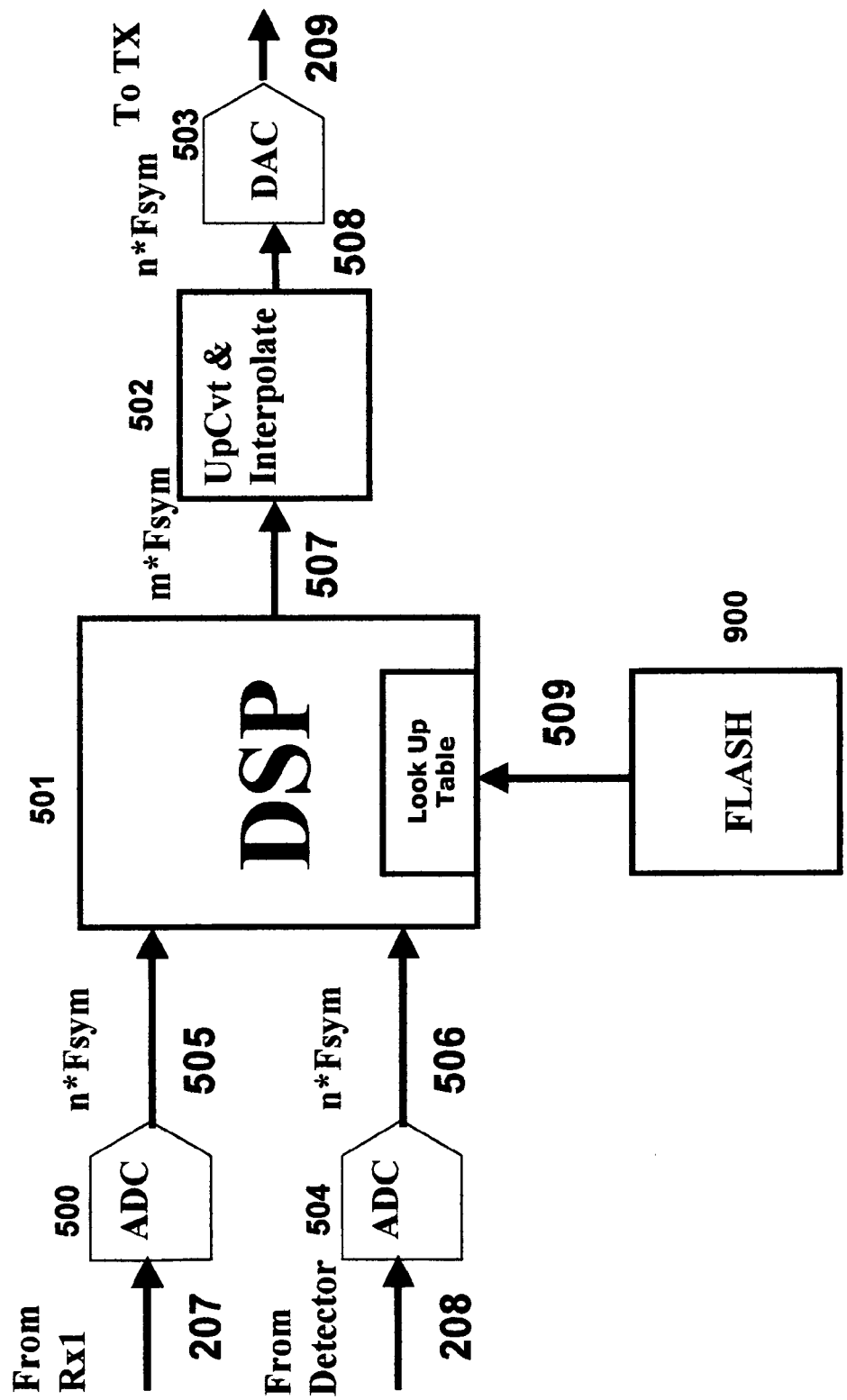
FIG. 3 is the block diagram of the digital processing unit of Crest Factor reduction and amplitude pre-distortion module

FIG. 3 shows the detail block diagram of the Crest Factor reduction and amplitude pre-distortion signal processing block 203. The multi-carrier receiver block 201 output 207 is applied to analog to digital converter (in case the signal is RF, IF, or baseband) block 500 to produce the digital signal 505. If the signal is RF or IF the analog to digital conversion is based on sub-harmonic sampling. The output of the analog to digital converter 500 is applied to the DSP block 501 for down conversion and decimation to produce "m" sample per symbol. In case the signal is a multi-carrier baseband, the signal may need to be interpolated or decimated to produce the right number of samples per symbol. If the signal is baseband but in bit format then an up conversion function in 501 is used. The signal is first converted to symbol domain with desired samples per symbol and then each channel is up converted to its baseband frequency to produce multi-carrier baseband. The DSP block 501 also performs Crest Factor reduction and amplitude pre-distortion and produce signal 507. The Crest Factor reduced and amplitude pre-distort signal 507 is applied to up converter and interpolator 502 to produce the up converted and interpolated signal 508. Signal 508 is applied to digital to analog converter 503 to produce the analog signal 209 for the multi-carrier transmitter block 204.

Figure 4:
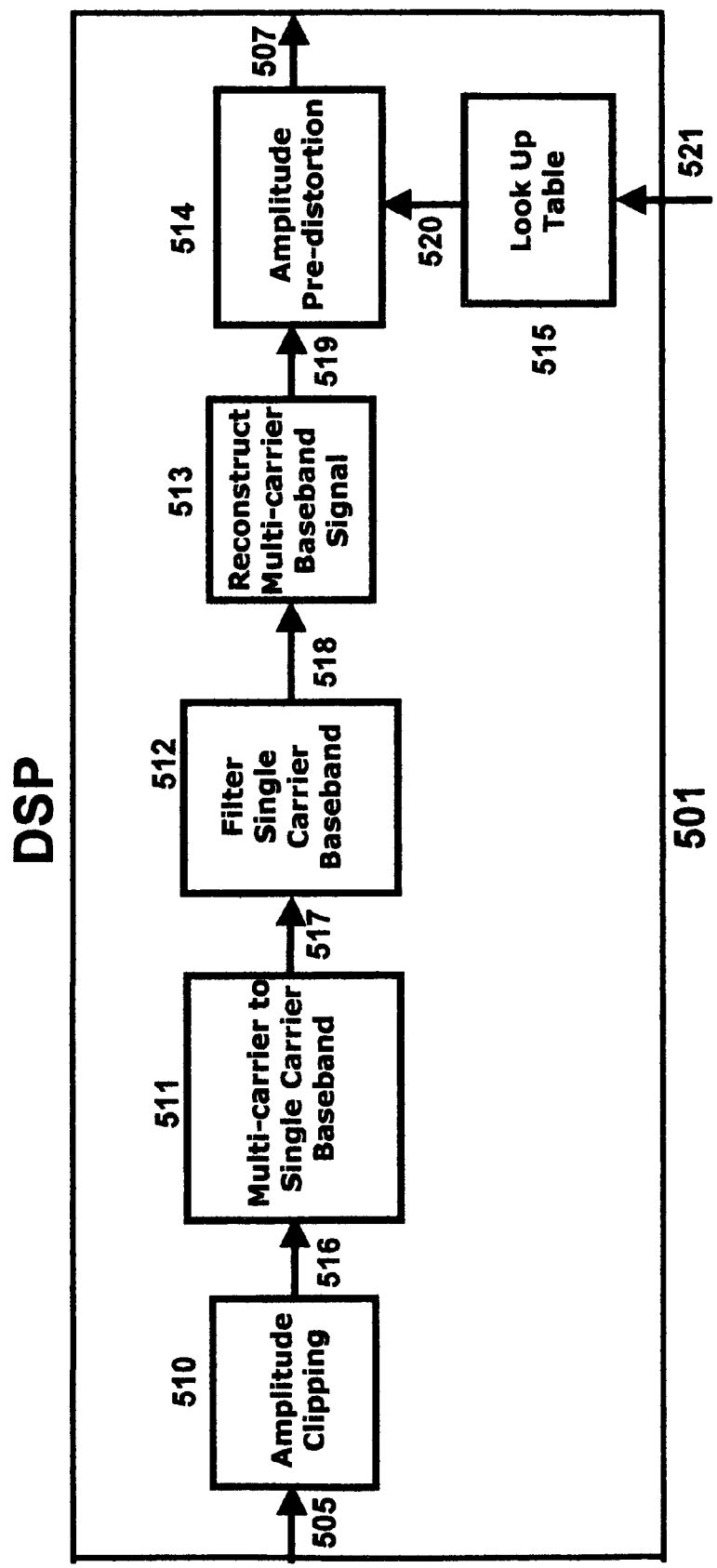
FIG. 4 is the block diagram of the digital signal processing block performing the Crest Factor reduction and amplitude pre-distortion

FIG. 4 shows the block diagram of the Crest Factor reduction and amplitude pre-distortion block 502. The multi-carrier baseband signal 505 from the main multi-carrier receiver 201 has its amplitude clipped by amplitude clipping block 510 to produce amplitude limited multi-carrier signal 516. The amplitude limited signal 516 is down converted to single carrier baseband signals by block 511 to produce the baseband representative of each individual carrier. The individual single carrier baseband signals 517 are filtered by filter block 512 to produce the filtered signals 518. The filtered signals 518 are applied to block 513 to reconstruct the multi-carrier baseband signal 519. The reconstructed multi-carrier signal 519 is amplitude pre-distorted by block 514 using data from look up table 515 to produce Crest Factor reduced and amplitude pre-distorted signal 507.

Figure 5:
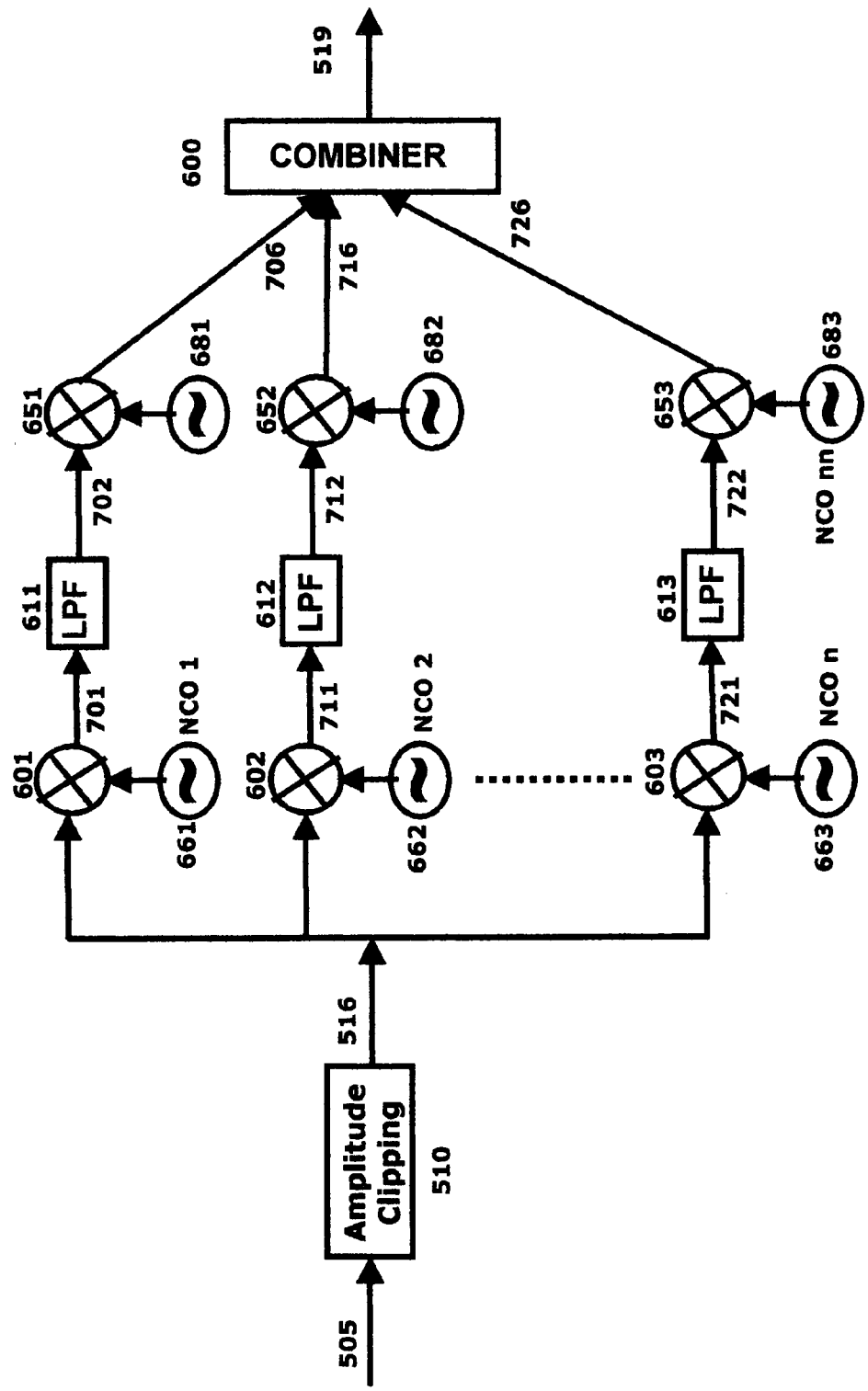
FIG. 5 is the detail block diagram of Crest Factor reduction

FIG. 5 shows the detail block diagram of the Crest Factor reduction circuit. The multi-carrier baseband signal 505 from the receiver is applied to amplitude clipping block 510 to produce amplitude limited multi-carrier signal 516. The amplitude limited signal 516 is applied to down converters 601, 602, and 603 to produce the baseband signal of each carrier 701, 711, and 721. The second input to down converters 601, 602, and 603 are supplied by NCOs 661, 662, and 663. The baseband representative of each carrier then is applied to Low Pass Filters (LPF) 611, 612, and 613 to filter unwanted signals. The filtered baseband representative of each carrier 702, 712, and 722 is applied to up converter blocks 651, 652, and 653. The other signal used by up converter is supplied by NCOs 681, 682, and 683. The up converted signals 706, 716, and 726 are then combined in block 600 to produced the new multi-carrier baseband signal 519. In FIG. 5 only a multi-carrier with 3 carrier is shown. This approach can be applied to unlimited number of carriers.

Figure 6:
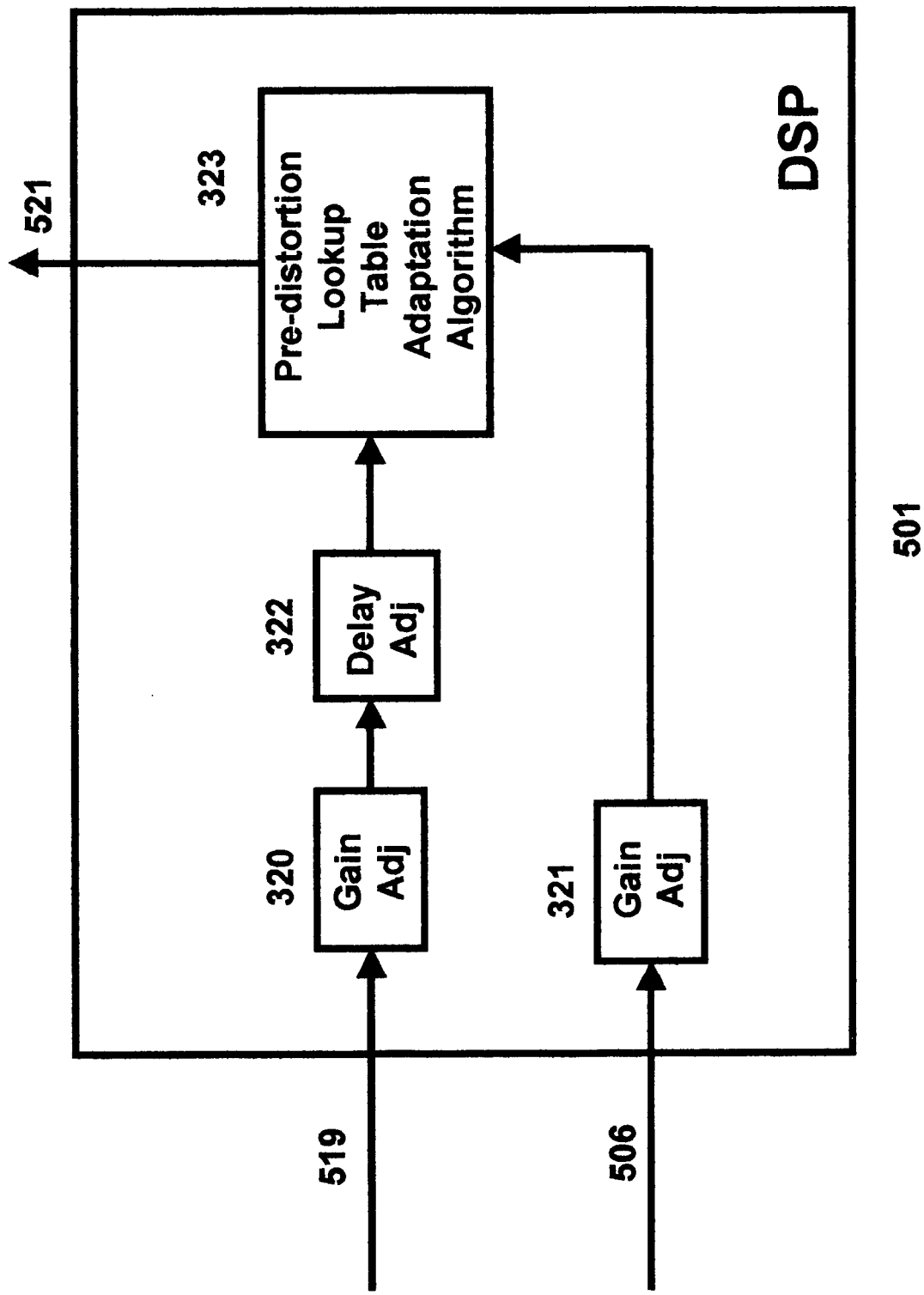
FIG. 6 is the block diagram of the look up table adaptation algorithm

FIG. 6 shows the detail block diagram of the lookup table adaptation algorithm. The multi-carrier Crest Factor reduced baseband signal 519 from the main multi-carrier receiver is gain adjusted by 320 and delay adjusted by 322 and then applied to look up table adaptation algorithm 323. The feedback multi-carrier digitized envelop signal 506 from the feedback envelop detector block 202 is gain adjusted 321 before being applied to lookup table adaptation algorithm 323. The adaptation algorithm 323 uses the two signal to produce the update values 521 for the lookup table 515. The adaptation algorithm can use one of the existing prior art techniques.

Figure 7:
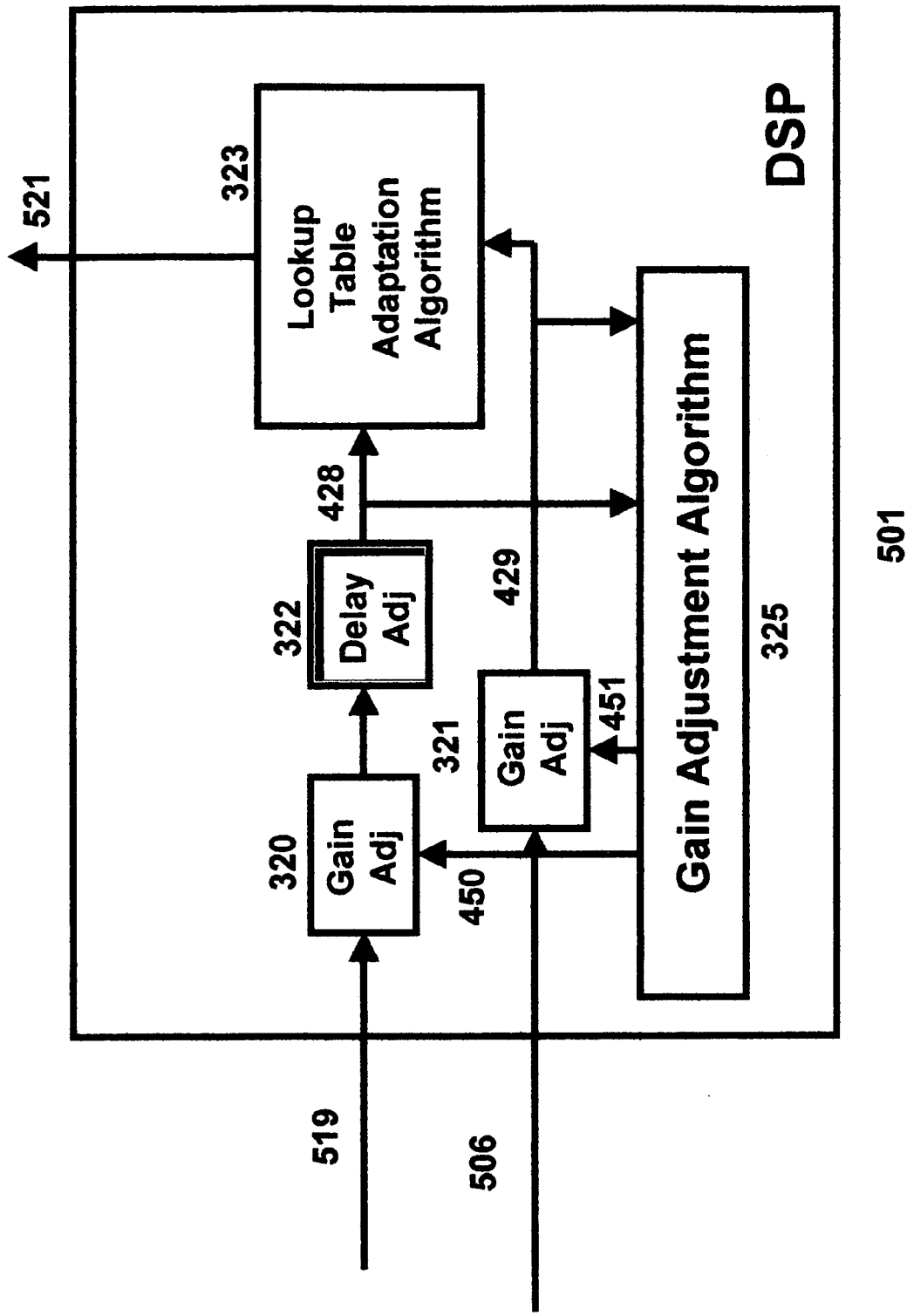
FIG. 7 is the block diagram of the gain adjustment algorithm

FIG. 7 shows the gain adjustment procedure in the path of the two inputs 519 and 506 to the lookup table adaptation algorithm block 323. Block 325 the gain adjustment algorithm gets its input from the output of the blocks 321 and 322. The automatic gain control operation with common set-point which is performed by block 325 adjust the gain in blocks 320 and 321, which allow the lookup table adaptation algorithm to operate on signals of known and common amplitude level. The dynamic range requirements of the adaptation algorithm is therefore reduced. This automatic gain control operation is not performed upon the main multi-carrier input signal in the main signal path.

Figure 8:
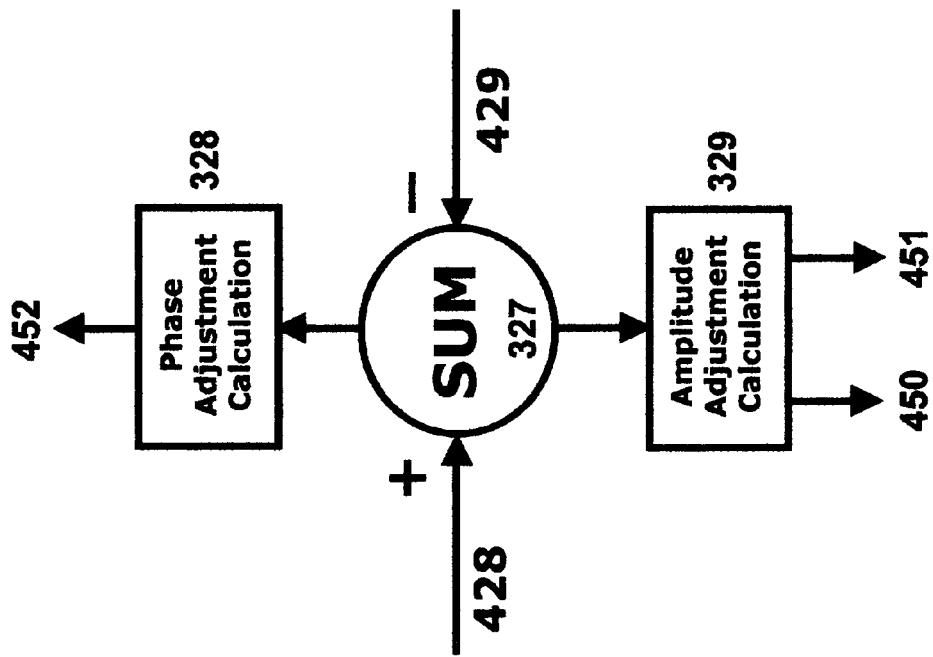
FIG. 8 is the block diagram of the summing correlator used in both gain and phase adjustment algorithms.

FIG. 8 shows the detail of the correlator or comparator which can be used in both delay adjustment and gain adjustment algorithms. The signals 428 and 429 with reverse polarity are applied to the block 327 to be summed. The output of block 327 should be zero if both signals 428, and 429 are aligned in time and have the same amplitude. This concept is used in the gain adjustment algorithm. In the case of the gain adjustment algorithm during calibration an all 1s or all 0s digital sequence with known amplitude is used for signal 519 and send to the amplifier. Then the amplitude of the signal 519 and the envelop of the feedback signal from output of the amplifier 506 are gain adjusted in blocks 320 and 321 until the sum of signals 428 and 429 with reverse polarity in block 327 is zero. If the sum is not zero then for gain adjustment block 329 based on the output signal of the block 327 calculates the gain adjustment and send the gain adjustment values 450 and 451 to blocks 320 and 321. This process continues until the output of block 327 is zero. During the normal operation of the Crest Factor reduction and amplitude pre-distortion circuit the gain adjustment process continues using the actual signals.

Once the gain adjustment is completed, for phase adjustment a known digital pattern with high auto-correlation is sent to amplifier. The envelop of this kwon pattern signal 428 and the envelop of the feedback signal from output of the amplifier signal 429 with reverse polarity are applied to block 327 and summed. The output of block 327 then is applied to block 328 to calculated the amount of phase adjustment 452 that will be applied to phase adjustment block 322. This process will continue until the output of the block 327 converge to zero. During the normal operation of the Crest Factor reduction and amplitude pre-distortion circuit the phase adjustment process continues using the actual signals.

Figure 9:
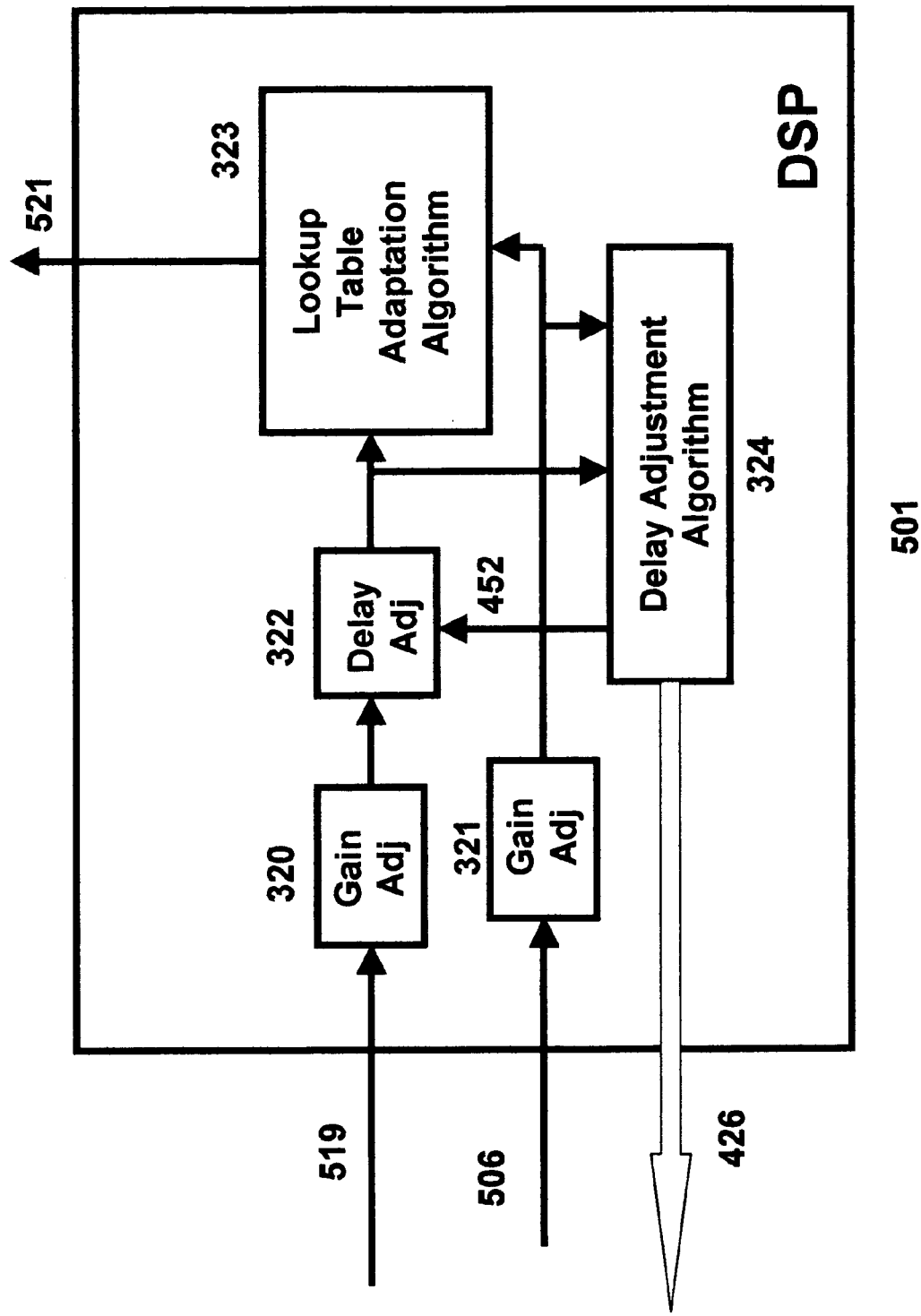
FIG. 9 is the block diagram delay adjustment algorithm

FIG. 9 shows the detail block diagram of the delay adjustment algorithm. The algorithm operates in two modes. During the initial mode the initial delay between main signal from the main multi-carrier receiver 201 and the feedback signal from the feedback envelop detector 202 is calculated. During this mode the signal 519 is replaced with a known sequence with very high auto-correlation. The signal input 506 will be decimated to m times the symbol rate, with a sampling phase resolution at minimum of 1/k times the symbol period by block 326. The sampling phase is repeatedly adjusted in increments of 1/k of the symbol period and correlated with known sequence 519 in block 324 to determine the delay present to a high degree of precision required by the lookup table adaptation algorithm in block 323. In operation, this delay will be compensated for by digitally delaying the signal from input 519 by an integer number of samples in block 322, and adjusting the sampling phase of the decimator in block 326 based upon the delay measurement results obtained in block 324 using the delay adjustment algorithm which is based on correlation of the output of blocks 322 and 321. In operation lookup table adaptation algorithm 323 then operates upon the output signal 100 from the wireless multi-carrier transmitter and the feedback envelop signal 104 from the amplifier output, which are precisely aligned in time and phase relative to each other. This adjustment is adaptively maintained during operation, to compensate for any delay variations caused by amplifier properties changing with aging effect and temperature variation.

Figure 10:
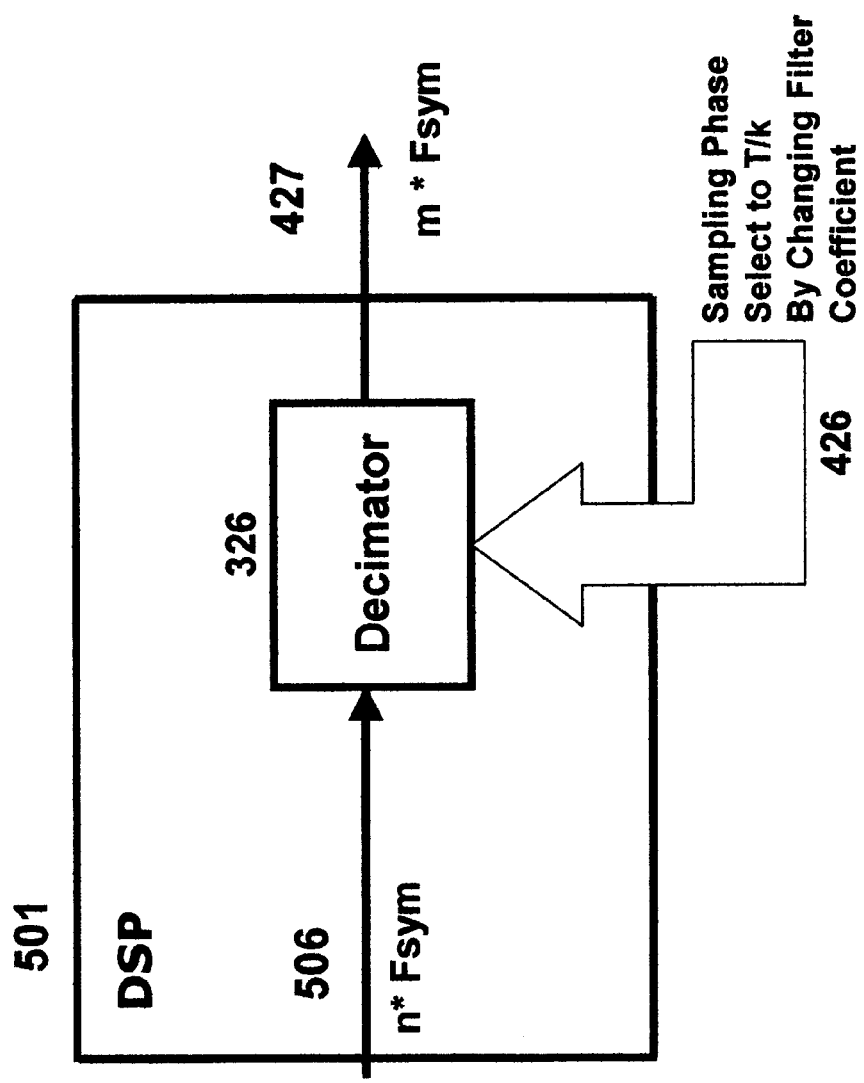
FIG. 10 is the block diagram of sample selection

FIG. 10 shows the decimator block diagram of 326, which is used for delay adjustment of the two inputs into the lookup table adaptive algorithm. The decimator filter coefficients are changed based on the delay adjustment algorithm block 324 output 426 to produce phase change steps of T/k.

What is claimed is:

1. A wireless Crest Factor reduction and amplitude pre-distortion circuit for use with multi-carrier signals in a wireless communication system to enhance the linearity and performance of the amplifier, in wireless cellular, PCS, wireless LAN, line of sight microwave, military, and satellite communication systems, the Crest Factor reduction and amplitude pre-distortion circuit comprising:

a multi-carrier receiver for the Crest Factor reduction and amplitude pre-distortion of IF or RF input signal to an amplifier, wherein the input signal is baseband then the multi-carrier receiver is bypassed;

an envelope detector that produces the envelope of the feedback multi-carrier signal from the output of the amplifier;

a digital signal processing function to reduce the Crest Factor of the multi-carrier input signal;

a digital signal processing function to limit or clip the amplitude of the multi-carrier signal;

a digital signal processing function that converts the amplitude clipped or limited multi-carrier baseband to baseband representative of individual carrier signals;

a digital signal processing function that filters the baseband representative of individual carrier baseband signals to remove unwanted signal produced due to clipping or limiting the multi-carrier signal amplitude;

a digital signal processing function that up converts the filtered baseband representative of each carrier to its original baseband frequency;

a digital signal processing function that pre-distorts the Crest Factor reduced multi-carrier signal using a look up table;

a multi-carrier transmitter that prepares the Crest Factor reduced and pre-distorted multi-carrier signal for delivery to an multi-carrier amplifier;

a digital signal processing function that adaptively updates an amplitude pre-distortion look up table;

a digital signal processing function that gain and phase adjusts the inputs to an amplitude pre-distortion adaptation algorithm.

2. The Crest Factor reduction and amplitude pre-distortion circuit according to claim 1, wherein multi-carrier input signal from the wireless transmitter is sampled using sub-harmonic sampling technique at the input frequency or at an intermediate frequency.

3. The Crest Factor reduction and amplitude pre-distortion circuit according to claim 1, wherein the multi-carrier input signal from the wireless transmitter is sampled using sub-harmonic sampling technique at the input frequency or at an intermediate frequency and the digitized multi-carrier input signal is decimated to the appropriate number of samples per symbol for further digital signal processing.

4. The Crest Factor reduction and amplitude pre-distortion circuit according to claim 1, wherein the multi-carrier input signal from the wireless transmitter is baseband and is sampled using Nyquist sampling technique and interpolated to produce the baseband multi-carrier signal with appropriate number of samples per symbol.

5. The Crest Factor reduction and amplitude pre-distortion circuit according to claim 1, wherein the multi-carrier input signal from the wireless transmitter is baseband and is sampled and decimated to produce the baseband multi-carrier signal with appropriate number of samples per symbol.

6. The Crest Factor reduction and amplitude pre-distortion circuit according to claim 1, wherein the multi carrier input signals from the wireless transmitter are in bit domain and the bit domain baseband signals are up converted, combined and interpolated to produce the digital multi-carrier baseband signal with appropriate number of sample per symbol.

7. The Crest Factor reduction and amplitude pre-distortion according to claim 1, wherein the digital multi-carrier signal is amplitude clipped or limited by a limiting or clipping function, wherein the amplitude limited multi-carrier signal is then down converted to single channel baseband signals by digital down conversion, wherein the individual baseband signals are filtered and up converted back to their original baseband frequency before all individual baseband signals being combined again to produce the multi-carrier Crest Factor reduced baseband signal.

8. The Crest Factor reduction and amplitude pre-distortion according to claim 1, wherein the multi-carrier signal amplitude clipping or limiting can also be perform in analog domain at an intermediate frequency (IF), radio frequency, or analog baseband before being digitized.

9. The Crest Factor reduction and amplitude pre-distortion circuit according to claim 1, wherein the peak suppressed, and pre-distorted main signal using a lookup table is digitally up converted and converted to analog domain at an intermediate frequency or the output frequency.

10. The Crest Factor reduction and amplitude pre-distortion circuit according to claim 1, wherein the peak suppressed, and pre-distorted main signal using a lookup table is converted to analog baseband signal for up convertion.

11. The crest Factor reduction and amplitude pre-distortion circuit according to claim 1, wherein feedback envelop signal from the wireless multi-carrier power amplifier is sampled using over sampling technique and the digitized feedback envelop input signal is decimated to the appropriate number of samples per symbol for further digital signal processing.

12. The Crest Factor reduction and amplitude pre-distortion circuit according to claim 1, wherein the digitized main signal and feedback envelop signal are used to adaptively update the pre-distortion lookup table, wherein main signal samples are delayed to match the samples from the amplifier feedback input before being used by lookup table adaptation algorithm, wherein the main signal samples and the amplifier feedback signal samples are gain controlled before being used by the lookup table adaptation algorithm.

13. The Crest Factor reduction and amplitude pre-distortion circuit according to claim 1, wherein main input signal and digitized feedback envelop input signal are aligned in amplitude by automatic gain control operations prior to further processing by the lookup table adaptive algorithm which updates the pre-distortion lookup table.

14. The Crest Factor reduction and amplitude pre-distortion circuit according to claim 1, wherein the delay described in claim 1 is measured by initially generating a digital signal with high auto-correlation property, such as a pseudo random sequence used by the main signal path, and correlation of this sequence with the amplifier output feedback envelop signal by delay adjustment algorithm, wherein the correlation window is incremented by adjusting the sampling phase in decimation block in the path of the amplifier output feedback envelop signal in T/k steps by changing the coefficients of the decimation filter in the amplifier output feedback envelop signal path, and by incrementing the delay of main input signal used by the delay adjustment algorithm by integer sample unit delays.

15. The Crest Factor reduction and amplitude pre-distortion circuit according to claim 1, wherein the gain adjustment described in claim 1 is measured by initially generating a digital signal with constant envelop property, such as a all 0s or all 1s sequence used by the main signal path, and correlation of this sequence with the amplifier output feedback envelop signal by gain adjustment algorithm, wherein the correlation window is incremented by adjusting the sampling phase in decimation block in the path of the amplifier output feedback envelop signal in T/k steps by changing the coefficients of the decimation filter in the amplifier output feedback envelop signal path, and by incrementing the delay of main input signal used by the delay adjustment algorithm by integer sample unit delays.

16. The Crest Factor reduction and amplitude pre-distortion circuit according to claim 1, wherein the correlator could be a simple sum function which add or subtract the main signal and the feedback envelop signal to produce an error signal, wherein the gain adjustment and delay adjustment algorithms find the value for gain and delay that minimizes the error signal.

17. The Crest Factor reduction and amplitude pre-distortion circuit according to claim 1, wherein the received signal strength of the input signal to Crest Factor reduction and amplitude pre-distortion circuit and transmit signal strength of the output from the Crest Factor reduction and amplitude pre-distortion circuit is dynamically measures to adjust the total gain of the Crest Factor reduction and amplitude pre-distortion circuit to zero.

18. The Crest Factor reduction and amplitude pre-distortion circuit according to claim 1, wherein the number of carriers can be as low as one carrier.

19. The Crest Factor reduction and amplitude pre-distortion circuit according to claim 1 and subsequent claims, when it is used in wireless cellular, wireless PCS, wireless LAN, microwave, wireless satellite, none wireless amplifiers, and any wireless communication systems used for military applications.

20. The Crest Factor reduction and amplitude pre-distortion circuit according to claim 1, wherein the DSP function can be implemented in programmable logic, FPGA, Gate Array, ASIC, and DSP processor.

* * * * *